(12) United States Patent
Goeckelmann et al.

(10) Patent No.: US 9,856,786 B2
(45) Date of Patent: Jan. 2, 2018

(54) ACTUATING DEVICE

(71) Applicant: Bosch Mahle Turbo Systems GmbH & Co. KG, Stuttgart (DE)

(72) Inventors: Jochen Goeckelmann, Salach (DE); Anatolij Martens, Eislingen (DE); Timo Tries, Weissach/Flacht (DE)

(73) Assignee: Bosch Mahle Turbo Systems GmbH & Co. KG (DE)

( * ) Notice: Subject to any disclaimer, the term of this patent is extended or adjusted under 35 U.S.C. 154(b) by 33 days.

(21) Appl. No.: 15/167,493

(22) Filed: May 27, 2016

(65) Prior Publication Data

US 2016/0348574 A1    Dec. 1, 2016

(30) Foreign Application Priority Data

May 28, 2015   (DE) .................. 10 2015 209 823

(51) Int. Cl.

| | |
|---|---|
| *F16K 25/00* | (2006.01) |
| *F02B 37/18* | (2006.01) |
| *F16K 31/44* | (2006.01) |
| *F16K 1/18* | (2006.01) |
| *F16K 1/32* | (2006.01) |
| *F16K 51/00* | (2006.01) |

(Continued)

(52) U.S. Cl.

CPC .......... *F02B 37/186* (2013.01); *F02B 37/183* (2013.01); *F16K 1/18* (2013.01); *F16K 1/20* (2013.01); *F16K 1/32* (2013.01); *F16K 1/36* (2013.01); *F16K 31/44* (2013.01); *F16K 51/00* (2013.01); *Y02T 10/144* (2013.01)

(58) Field of Classification Search
CPC .............................. F02B 37/183; F02B 37/186
USPC ............................................................ 251/86
See application file for complete search history.

(56) References Cited

U.S. PATENT DOCUMENTS

| | | | | |
|---|---|---|---|---|
| 579,171 | A | * | 3/1897 | Noyes ...................... B67D 7/42 |
| | | | | 137/445 |
| 2,479,688 | A | * | 8/1949 | Lindgren .................. F16K 1/36 |
| | | | | 251/86 |

(Continued)

FOREIGN PATENT DOCUMENTS

| | | |
|---|---|---|
| DE | 102010020340 A1 | 11/2011 |
| DE | 102011077626 A1 | 12/2012 |

(Continued)

OTHER PUBLICATIONS

English abstract for JP-2013-024139.

(Continued)

*Primary Examiner* — Umashankar Venkatesan
(74) *Attorney, Agent, or Firm* — Fishman Stewart PLLC

(57) ABSTRACT

An actuating device for a valve of an exhaust-gas turbocharger may include a lever arm and a flap plate connected to one another for closing and opening the valve. The flap plate may have a concave recess, and the lever arm may have a spherical region configured in a complimentary manner to the concave recess of the flap plate. A holding device may be disposed on the flap plate and engage around the spherical region of the lever arm to secure the flap plate on the lever arm. The holding device may include at least two holding elements and a connecting element that connects the at least two holding elements.

20 Claims, 3 Drawing Sheets

(51) Int. Cl.
  *F16K 1/20* (2006.01)
  *F16K 1/36* (2006.01)

(56) References Cited

U.S. PATENT DOCUMENTS

| | | | | |
|---|---|---|---|---|
| 4,923,173 A * | 5/1990 | Szymaszek | ............... | F16K 1/36 |
| | | | | 251/333 |
| 6,343,889 B1 | 2/2002 | Hendricks et al. | | |
| 9,127,590 B2 * | 9/2015 | Schoenherr | ........... | F02B 37/183 |
| 9,464,565 B2 * | 10/2016 | Yamaguchi | ........... | F02B 37/183 |
| 9,593,624 B2 * | 3/2017 | Segawa | ................ | F02B 37/186 |
| 2015/0118027 A1 * | 4/2015 | Zieboli | ................ | F02B 37/186 |
| | | | | 415/145 |

FOREIGN PATENT DOCUMENTS

| | | |
|---|---|---|
| DE | 102011089777 A1 | 6/2013 |
| DE | 102013214665 A1 | 1/2015 |
| JP | 2013-024139 A | 2/2013 |
| WO | WO-2013117636 A1 | 8/2013 |

OTHER PUBLICATIONS

German Search Report for DE-102015209823.0, dated Feb. 2, 2016.
English abstract for DE-102011089777.
English abstract for DE-102010020340.

* cited by examiner

ACTUATING DEVICE

CROSS-REFERENCE TO RELATED APPLICATIONS

This application claims priority to German Patent Application No. 10 2015 209 823.0, filed May 28, 2015, the contents of which are hereby incorporated by reference in its entirety.

TECHNICAL FIELD

The present invention relates to an actuating device for a valve, in particular for a wastegate valve of an exhaust-gas turbocharger. In addition, the invention relates to an exhaust-gas turbocharger with a wastegate valve and such an actuating device.

BACKGROUND

In general, modern exhaust-gas turbochargers are equipped with an electric or pneumatic actuator which is required for adjusting a valve device on the turbine (wastegate). The actuator is activated via a motor-actuated control and therefore moves a control rod. The control rod which is moved substantially linearly acts on a lever arm which converts the movement into a rotation and at the same time transmits same to the flap plate. These kinematics ensure that the mass flow is controlled by the wastegate valve. However, so that the kinematics function without friction all of the components have to have a minimum play and have to be freely movable. The minimum play is also required in order to compensate for thermal distortions and manufacturing tolerances.

However, because of the axial and radial play between the flap plate and the lever arm, which play is required in order to compensate for tolerances, annoying acoustic noises, for example rattling or chattering, which are distinct to a greater or lesser extent depending on the engine operating point, but always signify a loss of comfort, are produced during operation because of the engine vibrations and the pulsating mass flow of exhaust gas. In addition, this component play causes increased wear and leakage at said component over the service life.

In order to reduce this, a type of ball-and-socket joint connection is known from DE 10 2013 214 665 A1, with a lever arm and a flap plate, which is connected thereto, for closing an opening of the valve. The flap plate has a concave recess, wherein the lever arm has a spherical region which is formed in a complementary manner with respect to the concave recess of the flap plate and with which said lever arm engages in the concave recess of the flap plate. A holding device with two holding elements and a connecting element connecting the holding elements is provided on the flap plate, said holding device engaging around the spherical region of the lever arm and, as a result, securing the flap plate on the lever arm. By this means, in particular chattering noises are intended to be avoided. The connecting element is welded here to the holding elements, which is technically complicated and expensive.

SUMMARY

The present invention is therefore concerned with the problem of specifying an improved embodiment for an actuating device of the type in question, the improved embodiment in particular overcoming the disadvantages known from the prior art. According to the invention, this problem is solved by the subject matter of the independent claims. Advantageous embodiments are the subject matter of the dependent claims.

The present invention is based on the general concept of continuing to select a ball-and-socket joint connection for mounting a flap plate on a lever arm of a wastegate lever, but to secure said ball-and-socket joint connection in a structurally significantly simpler manner by means of a corresponding holding device, in particular without the previously required complicated and expensive welding. The actuating device according to the invention has said lever arm and the flap plate, which is connected thereto, for closing an opening of a valve, in particular a wastegate valve of an exhaust-gas turbocharger. In order to produce the ball-and-socket joint connection between the lever arm and the flap plate, the latter has a concave recess, whereas the lever arm has a spherical region which is formed in a complementary manner with respect to the concave recess of the flap plate and with which said lever arm engages in the concave recess of the flap plate. Said holding device with two holding elements and a connecting element connecting the holding elements is arranged on the flap plate, wherein the holding device engages around the spherical region of the lever arm and, as a result, secures the flap plate on the lever arm. Two alternative, but equivalent embodiments are now available for forming the holding device according to the invention without the previously required welding connection. In the first alternative, the holding elements each have a passage opening through which the band-like connecting element is guided, wherein the longitudinal ends of the connecting element are bent over and the connecting element is thereby secured on the holding elements. This constitutes a particularly simple embodiment of the holding device in which the previously required complicated and expensive welding can be dispensed with. In the second alternative embodiment of the solution according to the invention, the holding elements are of pin-like design and each have a circumferential groove (annular groove) which is arranged in the region of their free end. The connecting element has two subelements each having a longitudinal groove and a transverse groove, wherein the two subelements engage by means of their respective longitudinal groove in the circumferential groove of the one holding element and by means of their respective transverse groove in the circumferential groove of the other holding element. The holding device can also thereby be constructed in a structurally simple and therefore also cost-effective manner and in particular no longer requires the welding connection, which is known from the prior art and is obligatory, between the holding elements and the connecting element.

In an advantageous development of the solution according to the invention, according to the first alternative, the connecting element is designed as a sheet-metal strip. By this means, the connecting element can be produced from a band-shaped sheet-metal strip which is correspondingly cut to size. The sheet-metal strip can additionally be bent in the direction of the spherical region of the lever arm and, as a result, can act as a spring element, as a result of which it is possible to compensate at least for small manufacturing tolerances. This can likewise make it possible to improve the reduction in noise since a tendency to rattle or chatter can be reduced by the spring pretensioning of the lever arm against the flap plate.

In the case of the actuating device according to the invention according to the second alternative, the two subelements of the connecting element are designed as sheet-metal punched strips and, in each case in a central region, have a recess on the one longitudinal side and a tab on the opposite longitudinal side. In the fitted state, the two subelements here are arranged bearing against each other by a respective back such that the tab of the one subelement can be bent over into the associated recess of the other subelement and, as a result, engages in the associated recess of the other subelement and secures the two subelements on each other. By this means, the two subelements can therefore be pushed by means of their respective longitudinal groove into the annular groove or the circumferential groove of the one pin-like holding element and can then be rotated in an opposed manner with respect to each other about said circumferential groove until they are pushed by means of their respective transverse groove into the circumferential groove of the other holding element. In order to secure the two subelements, the respective tab of the one subelement can now be bent over into the associated recess of the other subelement and therefore an undesirable unscrewing of the two subelements can be avoided.

In an advantageous development of the solution according to the invention according to the second alternative, a spring element with two opposite longitudinal grooves is arranged between the two subelements, wherein the spring element engages by means of a respective longitudinal groove, in a circumferential groove of one of the two holding elements. A spring element of this type can in particular bring about a pretensioning of the lever arm against the flap plate and can therefore likewise contribute to a reduction in noise. A spring element of this type can be produced, for example, likewise as a sheet-metal punched strip which subsequently obtains a wavy structure formed in a central region. A spring element of this type can therefore be produced comparatively simply and cost-effectively, wherein it is also possible in this embodiment to design the two subelements of the connecting element as identical parts and, as a result, to achieve a reduction in the diversity of parts, which likewise contributes to a reduction in costs.

In an advantageous development of the solution according to the invention, in the installed state, the two subelements of the connecting element are welded or adhesively bonded to each other. In addition to the form-fitting connection by the respective tab of the one subelement being bent over into the recess of the other subelement, in addition to the securing the two subelements may be adhesively bonded, soldered or welded to each other.

Expediently, in an actuating device according to the invention according to the second alternative embodiment, in the fitted state, the two subelements are arched in relation to each other. By this means, it is possible, purely theoretically, to dispense with the spring elements arranged between the two subelements, and therefore in this case the two subelements are each designed as spring elements and bring about the noise-reducing spring effect. Of course, an arch design of only a single subelement is also conceivable.

In an advantageous development of the actuating device according to the invention, the two holding elements are formed integrally with the flap plate. Independently of the alternative embodiment of the actuating device according to the invention, the pin-like holding elements with their circumferential groove, but also the other holding elements with their passage opening, can therefore be formed integrally with the flap plate and, as a result, can be produced together with the flap plate in a structurally simple manner in a single working step.

Further important features and advantages of the invention emerge from the dependent claims, from the drawings and from the associated description of the figures with reference to the drawings.

It goes without saying that the features mentioned above and those which have yet to be explained below can be used not only in the respectively stated combination, but also in different combinations or on their own without departing from the scope of the present invention.

Preferred exemplary embodiments of the invention are illustrated in the drawings and are explained in more detail in the description below, wherein identical reference numbers refer to identical or similar or functionally identical components.

BRIEF DESCRIPTION OF THE DRAWINGS

In the drawings, in each case schematically.

DETAILED DESCRIPTION

Figure 1:
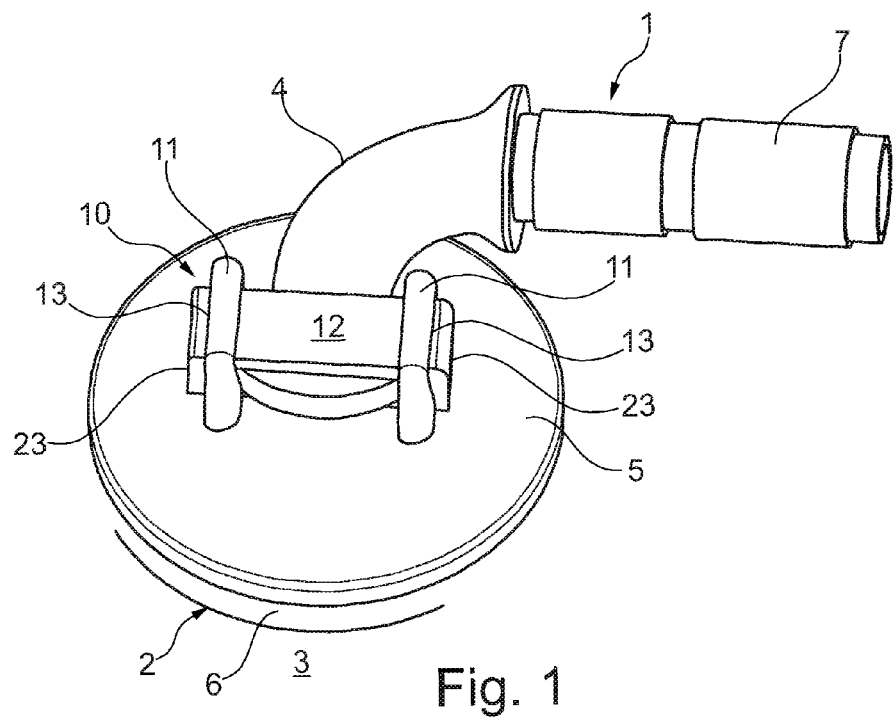
FIG. 1 shows a view of an actuating device according to the invention according to a first alternative embodiment.

According to FIGS. 1 to 3 and 6 and 7, an actuating device 1 according to the invention for a valve 2, in particular for a wastegate valve of an exhaust-gas turbocharger 3, has a lever arm 4 and a flap plate 5, which is connected thereto, for closing an opening 6 of the valve 2. The lever arm 4 is attached here to a spindle 7 of the actuating device 1. The flap plate 5 has a concave recess 8 while the lever arm 4 has a spherical region 9 which is formed in a complementary manner with respect to the concave recess 8 of the flap plate 5 and with which said lever arm engages in the concave recess 8 of the flap plate 5. Furthermore, a holding device 10 with two holding elements 11 and a connecting element 12 connecting the holding elements 11 is provided on the flap plate 5, said holding device engaging around the spherical region 9 of the lever arm 4 and, as a result, securing the flap plate 5 on the lever arm 4.

In order to be able to configure an assembly of the actuating device 1 so as to be more cost-effective overall, the holding device 10 is designed in such a manner that a previously required complicated and expensive welding can be dispensed with. To this end, the solution according to the invention provides two alternative embodiments, of which the first alternative embodiment is illustrated according to FIGS. 1 and 2 and the second alternative embodiment is illustrated according to FIGS. 3 to 7.

Figure 2:
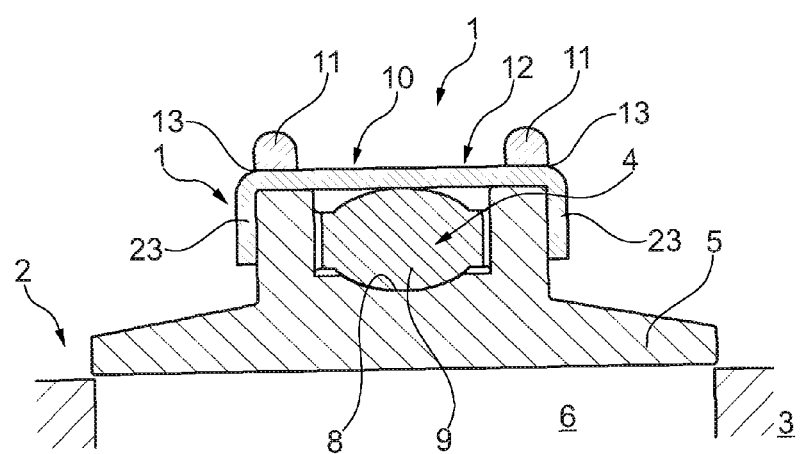
FIG. 2 shows a sectional illustration through the first alternative embodiment shown according to FIG. 1.
Figure 3:
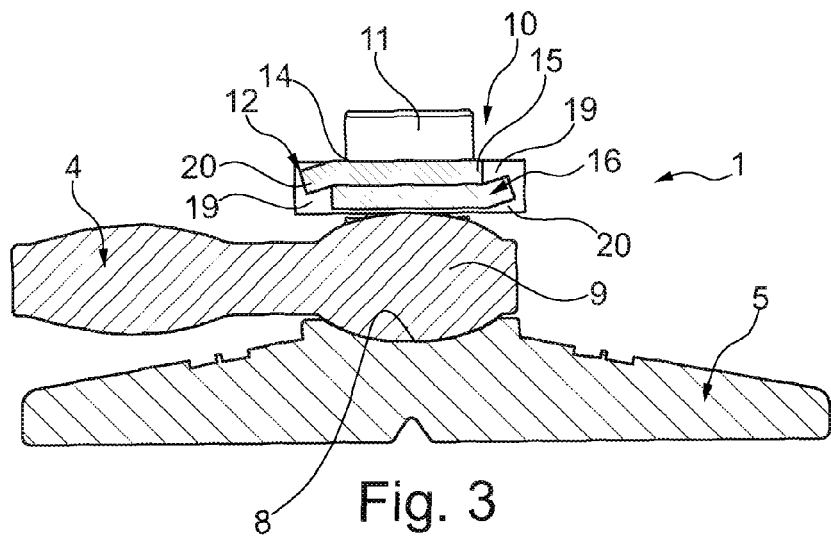
FIG. 3 shows a sectional illustration through the actuating device according to the invention according to a second alternative embodiment.
Figure 4:
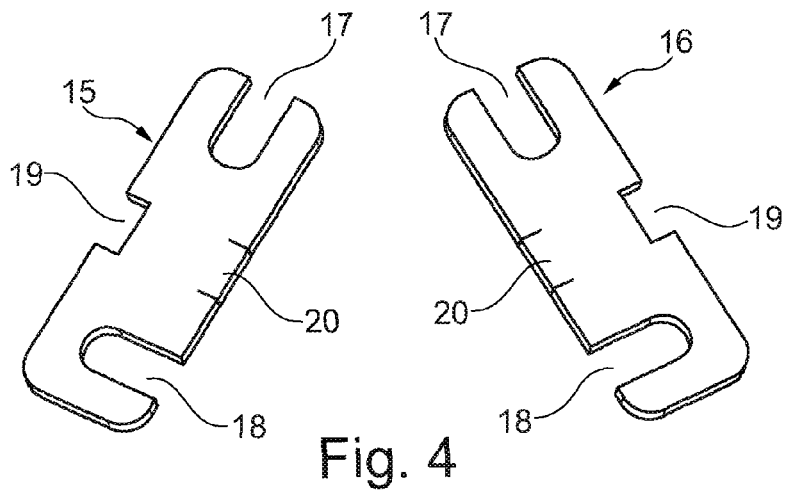
FIG. 4 shows two subelements of a connecting element.
Figure 5:
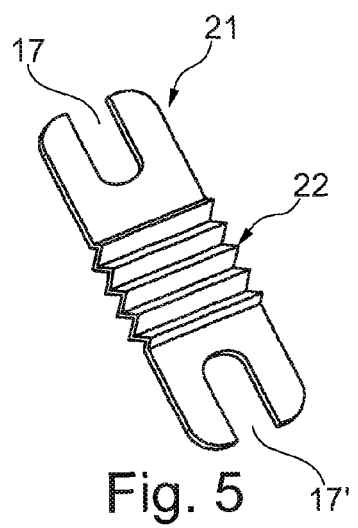
FIG. 5 shows a spring element.

If the first alternative embodiment of the solution according to the invention according to FIGS. 1 and 2 is examined, it can be seen that the holding elements 11 each have a passage opening 13 through which the guiding element 12 is guided, wherein the longitudinal ends 23 of the connecting element 12 are bent over and thus secure the connecting element 12 on the flap plate 5. By means of such an embodiment of the actuating device according to the invention, it is possible to form the connecting element 12 as a simple sheet-metal strip and, as a result, to produce same not only in a structurally simple manner but in addition also cost-effectively.

As can be seen from FIG. 2, the connecting element 12 enters into contact with the spherical region 9 of the lever arm 4 and, in addition, produces an at least small resilient effect which may differ in strength depending on the arrangement of the two passage openings 13 and depending on the thickness of the connecting element 12. In order additionally to reinforce a spring effect, it may in principle also be provided that the sheet-metal strip (connecting element 12) is bent in the direction of the spherical region 9 of the lever arm 4 and, as a result, acts as a spring element.

If the second alternative embodiment of the actuating device 1 according to the invention is examined, it can be seen that, in this case, the two holding elements 11 are of pin-shaped design and each have a circumferential groove 14 (annular groove), wherein the connecting element 12 has two subelements 15 and 16 each having a longitudinal groove 17 and a transverse groove 18 (FIG. 4) and engage by means of their respective longitudinal groove 17 in the circumferential groove 14 of the one holding element 11 and by means of their transverse groove 18 in the circumferential groove 14 of the other holding element 11. The two subelements 15, 16 are preferably designed here as sheet-metal punched strips and, in each case in a central region, have a recess 19 on the one longitudinal side and a tab 20 on the opposite longitudinal side (likewise see FIG. 4). In the fitted state, the two subelements 15, 16, which can be formed, for example, as identical parts, are arranged in a mirror-inverted manner to each other (cf. FIG. 4) and the tab 20 of the one subelement 15, 16 is bent into the associated recess 19 of the other subelement 16, 15 and, as a result, secures the two subelements 15, 16 on each other. By this means, a purely mechanical securing of the two subelements 15, 16 on each other would be possible. In addition or alternatively, it may, of course, also be provided that the two subelements 15, 16 are connected to each other in a different way, for example are adhesively bonded or welded to each other.

In a further advantageous embodiment of the second alternative solution, a spring element 21 (cf. FIGS. 5 and 6) with two opposite longitudinal grooves 17, 17' can be arranged between the two subelements 15, 16, wherein the spring element 21 engages by means of a respective longitudinal groove 17, 17' in a circumferential groove 14 of one of the two holding elements 11. The spring element 21 can have a wavy structure 22 in a central region, as a result of which an at least slight bending and therefore pushing of the two longitudinal grooves 17, 17' into the circumferential grooves 14 of the two holding elements 11 is possible. By means of the spring elements 21 arranged between the two subelements 15, 16, a pretensioning effect of the spherical region 9 of the lever arm 4 in the concave recess 8 of the flap plate 5 is intended to be able to be achieved and therefore the generation of noise reduced.

Figure 7:
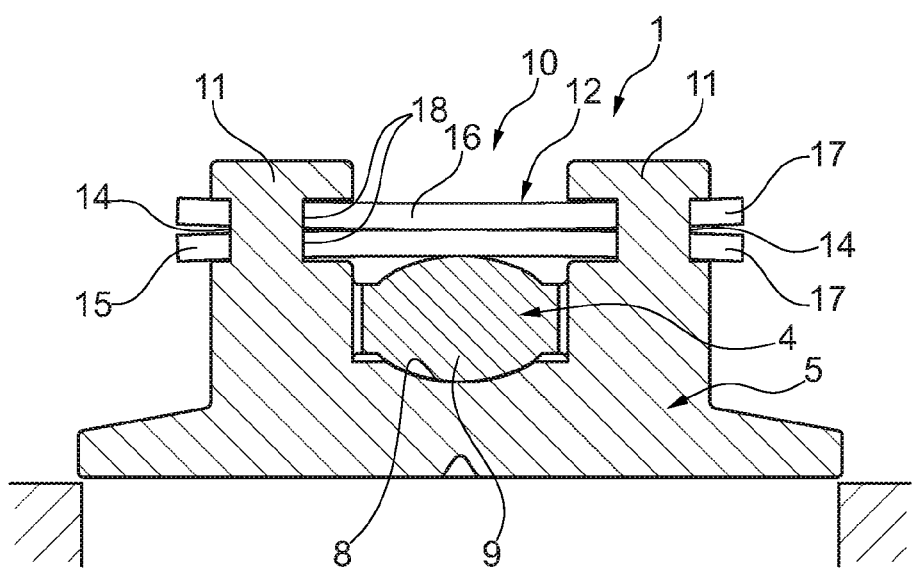

If the embodiment of the actuating device according to the invention according to FIG. 7 is examined, it can be seen that, in the fitted state, the two subelements 15, 16 are arched in relation to each other and, as a result, additionally obtain a spring effect. Of course, it is also conceivable here for only one of the two subelements 15, 16, for example the subelement 16, to be arched, while the other subelement 15 is of flat design.

Figure 6:
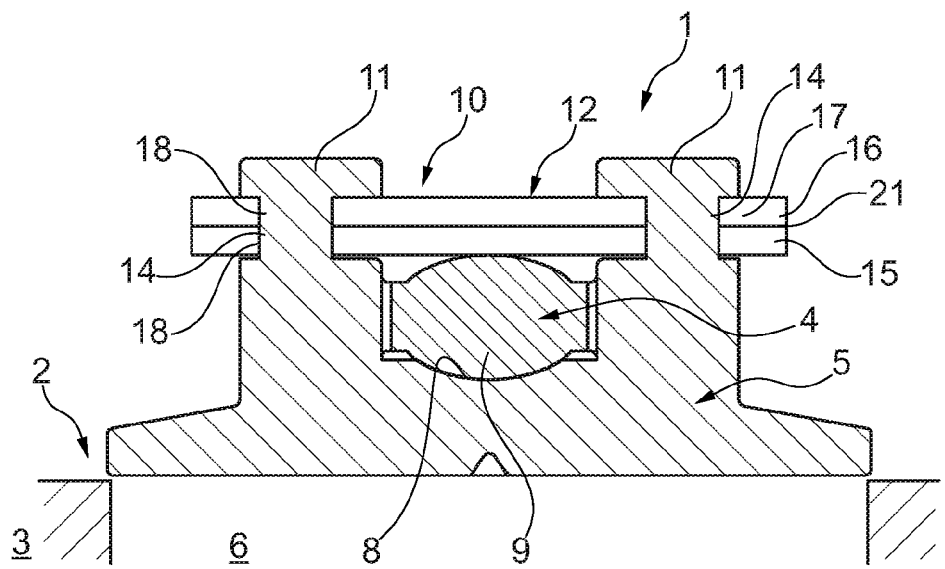
FIG. 6 shows a sectional illustration through the actuating device according to the invention with a connecting element with two subelements and a spring element arranged in between, FIG. 7 shows an illustration as in FIG. 6, but without the spring element and with two bent subelements.

If FIGS. 2 and 6 and 7 are examined once again, it can be seen that the two holding elements 11 are formed integrally with the flap plate 5, as a result of which in particular a cost-effective production of the flap plate 5 and also of the holding device 10 is possible.

With the holding device 10 according to the invention, it is possible in particular to completely dispense with a previously required welding of the connecting element 12 to the holding elements 11, as a result of which a structurally simpler and therefore also more cost-effective production can be achieved. Exchange of the flap plate 5 in the event of maintenance or repair is also possible in a simple manner.

The invention claimed is:

1. An actuating device for a valve of an exhaust-gas turbocharger, comprising:
a lever arm and a flap plate connected to one another for closing and opening the valve,
the flap plate having a concave recess,
the lever arm having a spherical region configured in a complementary manner with respect to the concave recess of the flap plate, wherein the lever arm via the spherical region engages in the concave recess of the flap plate,
a holding device including at least two holding elements and a connecting element connecting the at least two holding elements, the holding device being disposed on the flap plate and engaging around the spherical region of the lever arm to secure the flap plate on the lever arm, wherein at least one of:
the at least two holding elements each have a passage opening receiving the connecting element, and wherein the connecting element has longitudinal ends that are bent over to secure the connecting element, and
the at least two holding elements are configured pin-like and each having a circumferential groove, wherein the connecting element includes at least two subelements having a respective longitudinal groove and a respective transverse groove, and wherein the at least two subelements via the respective longitudinal groove engage in the circumferential groove of one of the at least two holding elements and the at least two subelements via the respective transverse groove engage in the circumferential groove of the other of the at least two holding elements.

2. The actuating device according to claim 1, wherein the connecting element is configured as a sheet-metal strip.

3. The actuating device according to claim 2, wherein the sheet-metal strip is bent in a direction of the spherical region of the lever arm to form a spring element.

4. The actuating device according to claim 1, wherein the connecting element includes the at least two subelements, and wherein the at least two subelements are configured as sheet-metal punched strips and have a recess in a central region on one longitudinal side and a tab in a central region on another longitudinal side opposite the one longitudinal side.

5. The actuating device according to claim 4, wherein the at least two subelements are coupled to one another such that the tab of one of the at least two subelements engages in the recess of the other of the at least two subelements to secure the at least two subelements on each other.

6. The actuating device according to claim 1, wherein the connecting element includes the at least two subelements, and further comprising a spring element with two opposite longitudinal grooves arranged between the at least two subelements, wherein the spring element engages via one of the longitudinal grooves in a respective one of the circumferential grooves of one of the at least two holding elements.

7. The actuating device according to claim 6, wherein the spring element has a wavy structure in a central region.

8. The actuating device according to claim 1, wherein the connecting element includes the at least two subelements, and wherein the at least two subelements are configured as identical parts.

9. The actuating device according to claim 1, wherein the connecting element includes the at least two subelements, and wherein the at least two subelements are at least one of welded and adhesively bonded to each other when installed.

10. The actuating device according to claim 1, wherein the connecting element includes the at least two subelements, and wherein at least one of the at least two subelements is arched when installed.

11. The actuating device according to claim 1, wherein the at least two holding elements are formed integrally with the flap plate.

12. An exhaust-gas turbocharger, comprising: a wastegate valve and an actuating device, the actuating device including:
   a lever arm coupled to a flap plate for opening and closing the wastegate valve, wherein the flap plate has a concave recess and the lever arm has a spherical region configured complementary to and engaging in the concave recess of the flap plate;
   a holding device including at least two holding elements and a connecting element, the connecting element connecting the at least two holding elements to one another, wherein the holding device is disposed on the flap plate and engages around the spherical region of the lever arm to secure the flap plate on the lever arm; and
   wherein at least one of:
      at least one of the at least two holding elements has a passage opening receiving the connecting element, and wherein the connecting element has a longitudinal end received in the passage and bent over against the flap plate to secure the connecting element; and
      at least one other of the at least two holding elements has a pin-like shape and includes a circumferential groove, and the connecting element including at least two subelements having a respective longitudinal groove and a respective transverse groove, wherein the at least two subelements engage in the circumferential groove via one of the respective longitudinal groove and the respective transverse groove.

13. The exhaust-gas turbocharger according to claim 12, wherein the at least two holding elements each have the passage opening and the connecting element is configured as a sheet-metal strip.

14. The exhaust-gas turbocharger according to claim 13, wherein the sheet-metal strip is bent in a direction of the spherical region of the lever arm to form a spring element.

15. The exhaust-gas turbocharger according to claim 12, wherein the connecting element includes the at least two subelements and the at least two subelements are configured as a respective sheet-metal punched strip, and wherein the respective sheet-metal punched strips have a recess in a central region on one longitudinal side and a tab in a central region on another longitudinal side opposite the one longitudinal side.

16. The exhaust-gas turbocharger according to claim 15, wherein the at least two subelements interact with one another such that the tab of one of the at least two subelements engages in the recess of another of the at least two subelements to secure the at least two subelements on each other.

17. The exhaust-gas turbocharger according to claim 12, wherein the at least two holding elements each have the pin-like shape and each include the circumferential groove; and
   wherein the actuating device further includes a spring element with two opposite longitudinal grooves arranged between the at least two subelements, wherein the spring element engages via one of the two longitudinal grooves in a respective circumferential groove of one of the at least two holding elements.

18. The exhaust-gas turbocharger according to claim 17, wherein the spring element has a wavy structure in a central region.

19. The exhaust-gas turbocharger according to claim 12, wherein the connecting element includes the at least two subelements and wherein at least one of the at least two subelements in arched when installed.

20. An actuating device for a valve, comprising:
   a lever arm coupled to a flap plate for opening and closing the valve, wherein the flap plate has a concave recess and the lever arm has a spherical region configured complementary to and engaging in the concave recess of the flap plate;
   a holding device including at least two holding elements and a connecting element, the connecting element connecting the at least two holding elements to one another, wherein the holding device is disposed on the flap plate and engages around the spherical region of the lever arm to secure the flap plate on the lever arm; and
   wherein one of:
      the at least two holding elements each have a passage opening receiving the connecting element, and wherein the connecting element has longitudinal ends bent over in a direction of the spherical region of the lever arm to secure the connecting element against the flap plate; and
      the at least two holding elements have a pin-like shape and each include a circumferential groove, and the connecting element includes at least two subelements having a respective longitudinal groove and a respective transverse groove, and wherein the at least two subelements via the respective longitudinal groove engage in the circumferential groove of one of the at least two holding elements and the at least two subelements via the respective transverse groove engage in the circumferential groove of the other of the at least two holding elements.

* * * * *